(12) United States Patent
Toratani et al.

(10) Patent No.: US 9,088,101 B2
(45) Date of Patent: Jul. 21, 2015

(54) POWER SUPPLY CONNECTOR

(71) Applicant: FURUKAWA ELECTRIC CO., LTD., Chiyoda-ku, Tokyo (JP)

(72) Inventors: Tomoaki Toratani, Tokyo (JP); Naomi Takahashi, Tokyo (JP); Tsuyoshi Oshima, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/497,335

(22) Filed: Sep. 26, 2014

(65) Prior Publication Data

US 2015/0011111 A1    Jan. 8, 2015

Related U.S. Application Data

(63) Continuation of application No. PCT/JP2013/054129, filed on Feb. 20, 2013.

(30) Foreign Application Priority Data

Mar. 29, 2012  (JP) .................................. 2012-078145

(51) Int. Cl.
*H01R 13/629* (2006.01)
*H01R 13/639* (2006.01)
(Continued)

(52) U.S. Cl.
CPC ...... *H01R 13/62977* (2013.01); *B60L 11/1818* (2013.01); *H01R 4/48* (2013.01); *H01R 13/6392* (2013.01); *H01R 13/6683* (2013.01); *B60L 2230/12* (2013.01); *B60L 2230/16* (2013.01); *B60L 2270/32* (2013.01);
(Continued)

(58) Field of Classification Search
CPC .. H01R 13/639; H01R 13/6272; H01R 13/62; H01R 13/641
USPC ......... 439/345, 350–352, 157, 310–311, 372, 439/357
See application file for complete search history.

(56) References Cited

U.S. PATENT DOCUMENTS 5,575,675 A    11/1996  Endo et al.
5,873,737 A *   2/1999  Hashizawa et al. ............. 439/39
(Continued)

FOREIGN PATENT DOCUMENTS

JP    6188044 A    7/1994
JP    7282902 A    10/1995
(Continued)

OTHER PUBLICATIONS

International Search Report mailed May 14, 2013, corresponding to International Application No. PCT/JP2013/054129.

*Primary Examiner* — Edwin A. Leon
(74) *Attorney, Agent, or Firm* — Lowe Hauptman & Ham, LLP

(57) ABSTRACT

The link member (10a) is connected to the lock lever (7) by a pin (23d). Thus, the link member (10a) is pulled to an upward direction by the upward movement of the lock lever (7). At this point, with the movement of the lock lever 7, the link members (10a) and (10b) operate toward a direction that increases the angle between the two, and the plunger (22a) connected to the linkage (15c) moves backward. Thus, when the plunger (22a) is unable to move with respect to the body of the electromagnetic solenoid (22) due to freezing etc., the linkage (15c) is unable to move. Therefore, in such a case, the lock lever (7) becomes inoperable.

4 Claims, 15 Drawing Sheets

(51) Int. Cl.
 *B60L 11/18* (2006.01)
 *H01R 4/48* (2006.01)
 *H01R 13/66* (2006.01)
 *H01R 13/627* (2006.01)

(52) U.S. Cl.
 CPC ........ *B60L 2270/34* (2013.01); *H01R 13/6275* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(56) References Cited

U.S. PATENT DOCUMENTS 6,123,569 A * 9/2000 Fukushima et al. .......... 439/456
6,283,781 B1 9/2001 Mori
8,206,171 B2 * 6/2012 Osawa et al. ................. 439/352
8,500,476 B2 * 8/2013 Hori et al. ..................... 439/310
2002/0177348 A1 * 11/2002 Karamatsu et al. ........... 439/352
2012/0088384 A1 4/2012 Hori et al.

FOREIGN PATENT DOCUMENTS

| | | |
|---|---|---|
| JP | 2001135414 A | 5/2001 |
| JP | 2011138644 A | 7/2011 |
| JP | 2012079665 A | 4/2012 |
| JP | 2012174643 A | 9/2012 |
| WO | 2011081124 A1 | 7/2011 |

* cited by examiner (a)

(b)

(a)

(b)

(a)

(b)

(a)

(b)

POWER SUPPLY CONNECTOR

RELATED APPLICATIONS

The present application is a continuation of International Application Number PCT/JP2013/054129, filed Feb. 20, 2013, which claims priority from Japanese Application Number 2012-078145, filed Mar. 29, 2012. The disclosures of the above-listed applications are hereby incorporated by reference herein in their entirety.

TECHNICAL FIELD

The present invention relates to a power supply connector for rapid charging, which is used in electric automobiles.

BACKGROUND ART

In recent years, from the view point of global environmental issues, electric automobiles that do not use fossil fuels are attracting attention. Electric automobiles are equipped with a battery for driving, and run on electricity charged in the battery.

For charging electric automobiles, there are methods of charging from regular domestic power sources and methods of rapid charging using special charging equipments. In a method that utilizes domestic power source, a special connector is unnecessary, but charging requires a long time, and thus, charging is done at night or in the hours when the automobile is not used. On the other hand, for continuous running of long distances, as with conventional refueling at gas stations, rapid charging at power supply spots provided at various places becomes necessary.

As a connector for such electric automobiles, for example, a power supply connector, which comprises a case, a connector body that is slidably mounted to this case and accommodates multiple terminals, a pipe-shaped handle that is slidably mounted along the same axis with the connector body, and a lever, wherein the handle moves forward with the rotation of the lever, and fits the connector body to the connector body of the power reception side, is known (Patent Document 1).

PRIOR ART DOCUMENTS

Patent Documents

[Patent Document 1] JP-A-H06-188044

SUMMARY OF THE INVENTION

Problem to be Solved by the Present Invention

On the other hand, in such a connector for rapid charging, arc discharge can occur the moment the power supply connector and the power reception connector are pulled out during electric conduction while charging, which may cause the breakout of fire. Thus, a lock mechanism is necessary to prevent the connection of the connectors from becoming disconnected during electric conduction.

FIG. 15 is a schematic figure of a conventional power supply connector 100. As shown in FIG. 15(a), the power supply connector 100 is composed of a grasping member 103, a case 109, a connector body 111, etc. The connector body 111 is provided at the tip of the grasping member 103. The grasping member 103 and the connector body 111 are slidable with respect to the case 109. The connector connection process is performed by pressing the connector body 111 against a power reception connector, which is abbreviated in the figure, while the operator holds the handle 105.

A concaved part 119 is formed on the case 109. Further, a lock lever 107 that is rotatably fixed to the grasping member 103 with a pin 113 is provided on the grasping member 103. One end of the lock lever 107 is exposed from the back side of the grasping member 103, and can be operated by the operator. Further, a lock pin 107a is formed on the other end of the lock lever 107. In a normal state, the lock pin 107a is not invaginated into the concaved part 119 and the back end of the lock lever 107 is pressed downward.

As shown in FIG. 15(b), when the connector body 111 is pushed into the power reception connector (in the direction of arrow X in the figure) from this state, the grasping member 103 moves with respect to the case 109. Thus, the connector body 111 protrudes from the front of the case 109, and connects with the connector on the power reception side. Note that in this case, the case 109 is fixed to the connector of the power reception side by a lock mechanism that is abbreviated from the figure.

Here, by the relative movement of the case 109, the lock pin 107a moves to the position of the concaved part 119. Thus, the lock lever 107 rotates with the pin 113 as the pivot point (in the direction of arrow Y in the figure), and the lock pin 107a fits into the concaved part 119.

The electromagnetic solenoid 115, which is fixed to the grasping member 103, is operated in this state (in the direction of arrow Z in the figure). This leads the protrusion of the lock lever 107 to come in contact with the plunger of the electromagnetic solenoid 115, and the rotation of the lock lever 107 is regulated. Hence, a state in which the lock pin 107a is pressed against the concaved part 119 is maintained. Thus, the connector body 111 can be fixed with respect to the case 109, and the connector body 111 will not come loose from the reception connector.

However, especially in cold climates, there are times when the electromagnetic solenoid 115 freezes and becomes inoperable. In such a case, the plunger does not move even when the electromagnetic solenoid 115 is worked, and the rotation of the lock lever 107 cannot be regulated. For this reason, the operator is capable of releasing the lock lever while electric conduction takes place between the connector body 111 and the power reception connector during charging etc., to retract the connector body 111 with respect to the case 109. When such operation takes place, as described previously, arc discharge may occur at the moment the connectors come apart.

Note that normally, a limit switch etc. detects the fitting of the lock pin 107a to the concaved part 119, but there is a slight time-lag before the turn-off of the limit switch to the complete shutdown of electric conduction. Thus, when the operator operates the lock lever 107 to immediately pull out the connector during electric conduction, the occurrence of arc discharge cannot be prevented with certainty.

The present invention was made in view of such problems, and its object is to provide a power supply connector that can prevent the connector from disconnecting during electric conduction.

Means for Solving the Problem

In order to achieve the above-described object, the present invention provides a power supply connector for automobiles, which comprises: a connector body; a case for accommodating the connector body; a grasping member that is attached to the case; a lock lever that limits the movement of the case with respect to the grasping member; a link member that is connected to the lock lever and the grasping member;

and an electromagnetic solenoid that is fixed to the grasping member; wherein a plunger of the electromagnetic solenoid is connected to the link member, the connector body and the grasping member are slidable in a direction of nearly the same axis line with respect to the case, when the lock lever is in a released state, and by sliding the grasping member with respect to the case and locking the lock lever to the case, the link member operates along with the operation of the lock lever, while the position of the plunger connected to the link member changes, and further, by operating the electromagnetic solenoid, a locked state, in which the lock lever is locked to the case by the link member, is maintained.

The case preferably comprises a detection means that is capable of detecting the locked state of the lock lever.

It is preferable that the electromagnetic solenoid operates when a state of electric conductibility with respect to the connector body is obtained, by detecting the locked state of the lock lever with the detection means, and electricity is conducted to the connector body, whereby the electromagnetic solenoid operates.

It is preferable that the power supply connector further comprises: a first spring that presses the lock lever towards a direction of obtaining a locked state for the lock lever; and a second spring that retracts the plunger to the direction of the electromagnetic solenoid; wherein the sum of the force of pressing the plunger against the link member with the electromagnetic solenoid and the force of pulling out the plunger by moving the link member through the operation of the lock lever with the first spring, is larger than the retracting force of the plunger by the second spring.

According to the present invention, because the plunger of the electromagnetic solenoid moves via a link member when the lock lever is locked, when the plunger of the electromagnetic solenoid is inoperative due to freezing etc., the rotation of the lock lever becomes limited, and loses its function as a locking means that limits the movement of the case with respect to the grasping member. Thus, the fact that the plunger of the electromagnetic solenoid is unable to move due to freezing etc., can be perceived with certainty.

Further, by operating the electromagnetic solenoid, the lock lever can be fixed at a locked state. Thus, disconnection of the connector during electric conduction can be prevented.

Furthermore, by installing a detection means such as a limit switch etc., which detects the locked state of the lock lever, detachment of the connector during electric conduction can be prevented with more certainty.

Further, because electric conduction is made possible only when a locked state is detected by the detection means, and because the electromagnetic solenoid always operates during electric conduction, incorrect operation of the lock lever can be prevented with certainty.

Moreover, by providing a first spring that presses the lock lever towards the direction of obtaining a locked state of the lock lever, the lock lever automatically turns to a locked state when the connector body moves with respect to the case. Therefore, excellent operability is obtained. Further, by setting the sum of the force of pressing the plunger with the electromagnetic solenoid and the force of pulling out the plunger with the first spring to be larger than the restoring force of the plunger by the second spring, the lock lever can be fixed with certainty.

Effect of the Invention

According to the present invention, a power supply connector that can prevent the disconnection of the connector during electric conduction can be provided.

BEST MODE FOR CARRYING OUT THE INVENTION

Figure 1:
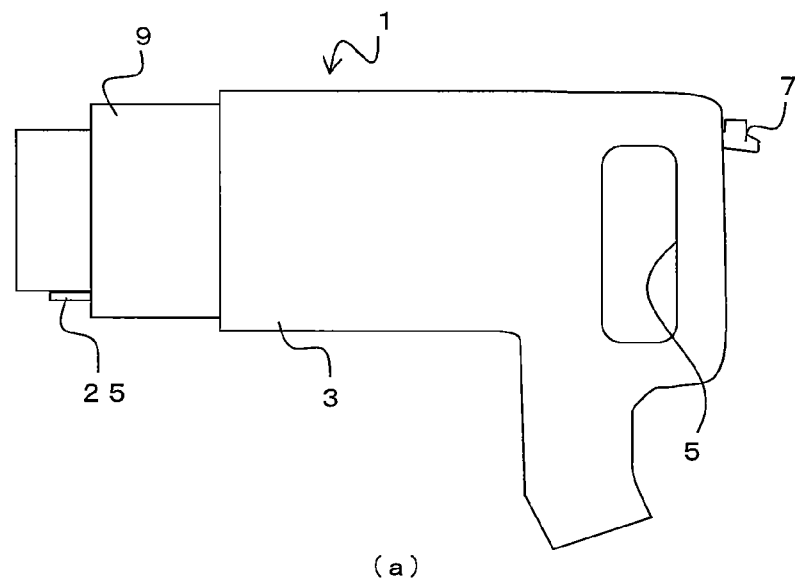
FIG. 1 is a figure that shows the power supply connector 1, and (a) is a side view, and (b) is a sectional side view.
Figure 1:
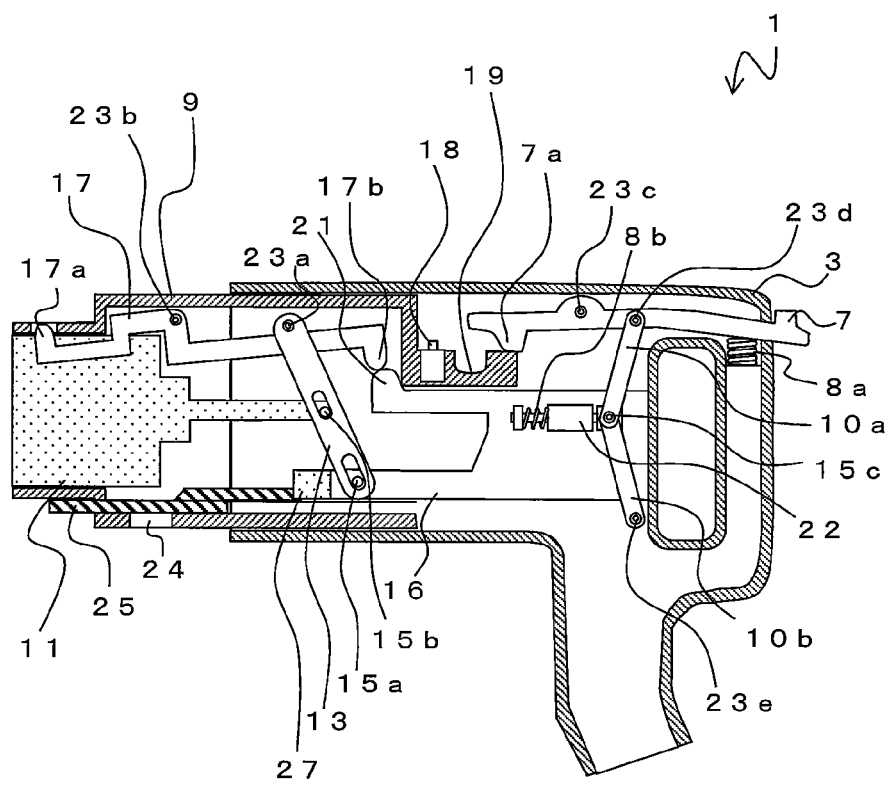

Hereinafter, embodiments of the present invention will be described with reference to the accompanying figures. FIG. 1 is a schematic diagram that indicates the power supply connector 1, and FIG. 1(a) is a side view, and FIG. 1(b) is a sectional side view. Note that in the present invention, the state shown in FIG. 1 is referred to as the normal state. Further, in the following figures, cables and such are abbreviated from the figure. The power supply connector 1 mainly comprises a grasping member 3, a case 9 and a connector body 11.

As shown in FIG. 1(a) and FIG. 1(b), the grasping member 3 comprises a handle 5 on one end (rear). The handle 5 is the part that is held by the operator when handling the power supply connector 1. Here, the handle 5 is formed so that at least part of the handle 5 is positioned on a line that extends from the central axis of the connector body 11. Thus, when the grasping member 3 is pushed in, force can be applied to the connector body 11 in a straight manner against the connection target. Therefore, the power supply connector shows excellent operability.

The interior of the grasping member 3 can accommodate various structures. A case 9 is provided on the other end (front) of the grasping member 3. The vicinity of the front end of the grasping member 3 is cylindrical, and part (rear end) of the case 9 is accommodated within the grasping member 3. The grasping member 3 can slide back and forth with respect to the case 9.

The case 9 is a cylindrical member and the connector body 11 is accommodated in the front end of the case 9. The connector body 11 can slide back and forth with respect to the case 9. Note that each slidable part of the grasping member 3 and the connector body 11, with respect to the case 9, may contain guide mechanisms and stoppers that regulate the slidable area, which are abbreviated from the figure.

Inside the case 9 is provided an arm 13. The vicinity of one end of the arm 13 is rotatably attached to the case 9 with a pin 23a. The vicinity of the other end of the arm 13 is connected to a connection bar 16, which is joined to the grasping member 3, at a linkage 15a. At the linkage 15a, both parts are rotatably connected by an elongated hole formed on the arm 13 and a pin etc. formed on the connection bar 16.

The arm 13 is connected to the connector body 11 by the linkage 15b substantially at the center (between pin 23a and linkage 15b). The structure of linkage 15b is similar to that of linkage 15a. That is, when the arm 13 rotates, the connector body 11 and the grasping member 3 are movable on a straight line with respect to the case 9, along with the rotation of the arm 13.

In the case 9 is provided a locking member 17. The locking member 17 is rotatably attached to the case 9 by a pin 23b. A lock pin 17a is formed in an upward direction at the front end of the locking member 17. The lock pin 17a is arranged at the position of an opening formed on the case 9.

At the rear end of the locking member 17 is provided a joint 17b in a downward direction. The joint 17b is in a convex shape that can fit a joint 21. The joint 21 is fixed on the grasping member 3. In a normal state, the joints 17b and 21 do not fit and the protrusion of the joint 17b is positioned on top of the protrusion of the joint 21. Further, in this state, because the joint 17b is pushed up by the joint 21 in an upward direction, the lock pin 17a does not protrude from the case 9 (the opening formed on the case 9) and remains within the case 9 via pin 23b.

Inside the case 9 is provided a slider 25. One end of the slider 25 protrudes toward the front of the case 9. That is, a level difference is formed in the front of the case 9, and the slider 25 is exposed through this level difference. The slider 25 is slidable in the axial direction (the movement direction of the case 9, which is the insertion-extraction direction of the connector).

In part of the case 9 is formed an opening 24. The opening 24 allows observation of the position of the slider 25 within the case 9. Note that the arrangements of the slider 25 and the opening 24 are not limited to that shown in the figure and may be set arbitrarily. For example, the opening 24 may be arranged on the top surface or the side surface of the case 9 for easier observation, and the slider 25 may be arranged on the top or side of the power supply connector.

In the rear side of the slider 25 in the vicinity of the tip of the connection bar 16, is provided a locking member 27. The locking member 27 comes in contact with the slider 25 and is movable in response to the movement of the slider 25. The locking member 27 locks the case 9 and the grasping member 3. That is, the locking member 27 functions as a case-lock mechanism that locks the case 9 from moving with respect to the grasping member 3. Note that details of the mechanisms and movements of the slider 25, which is an insertion detection means, and the locking member 27, which is a case-lock mechanism, will be described later.

A lock lever 7, which is the operation part, is provided within the grasping member 3. The lock lever 7 is rotatably attached to the grasping member 3 by a pin 23c. The rear side end of the lock lever 7 protrudes out from the grasping member 3, allowing the operator to operate the lock lever 7 from the outside. A lock pin 7a is provided at the front of the lock lever 7 in a downward direction. The lock pin 7a comes in contact with part of the case 9, and is normally in a state of being pushed up. On the case 9 at the front side of the part that comes in contact with the lock pin 7a in a normal state, a concaved part 19, to which the lock pin 7a can fit into, is provided.

Further, a spring 8a is provided in the vicinity of the rear end of the lock lever 7. The spring 8a pushes up the vicinity of the rear end of the lock lever 7. That is, the lock pin 7a is pressed downward with the pin 23c as the fulcrum point.

Figure 2:
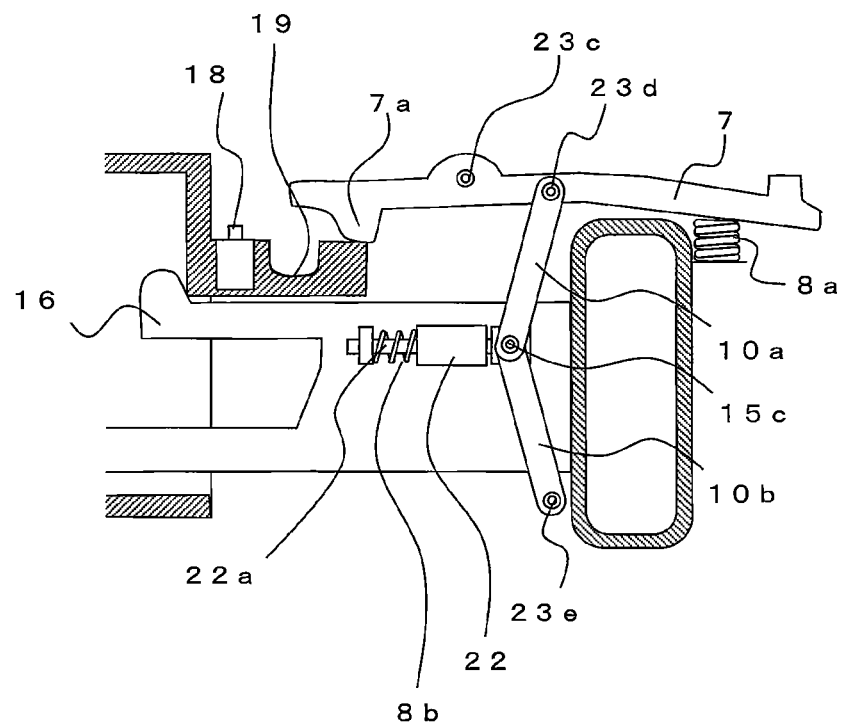
FIG. 2 is an enlarged view of the vicinity of the lock lever 7 of the power supply connector 1.

An electromagnetic solenoid 22 is connected to the lock lever 7 via link members 10a, and 10b. FIG. 2 is an enlarged view of the vicinity of the lock lever 7. At a position of the lock lever 7 further behind the pin 23c, one end of the link member 10a is rotatably connected with pin 23d.

The other end of the link member 10a is rotatably connected to one end of the link member 10b by a linkage 15c. Further, the other end of link member 10b is rotatably connected to the grasping member 3 by a pin 23e. Note that in a normal state, link members 10a and 10b are arranged at an angle from each other so that they are bent forward at the linkage 15c.

The electromagnetic solenoid 22 is fixed to the grasping member 3 in the vicinity of the linkage 15c. A plunger 22a penetrates the interior of the electromagnetic solenoid 22, and the plunger 22a can be operated by operating the electromagnetic solenoid 22. The end of the plunger 22a is connected to the linkage 15c. The plunger 22a is connected toward the rear side from the bent part (front) of the link members 10a and 10b in a normal state.

A spring 8b is provided on the electromagnetic solenoid 22. The spring 8b applies force to the plunger 22a in a direction that retracts the plunger 22a toward the rear. Thus, in a normal state, the plunger 22a is pulled toward the front side by the spring 8b, which also causes the linkage 15c to be pulled toward the front. The link members 10a and 10b receive force in a direction that decreases their angle by the linkage 15c being pulled toward the front. Here, because the pin 23e is fixed to the grasping member 3, the pin 23d goes in a state of being pulled downward.

Figure 3:
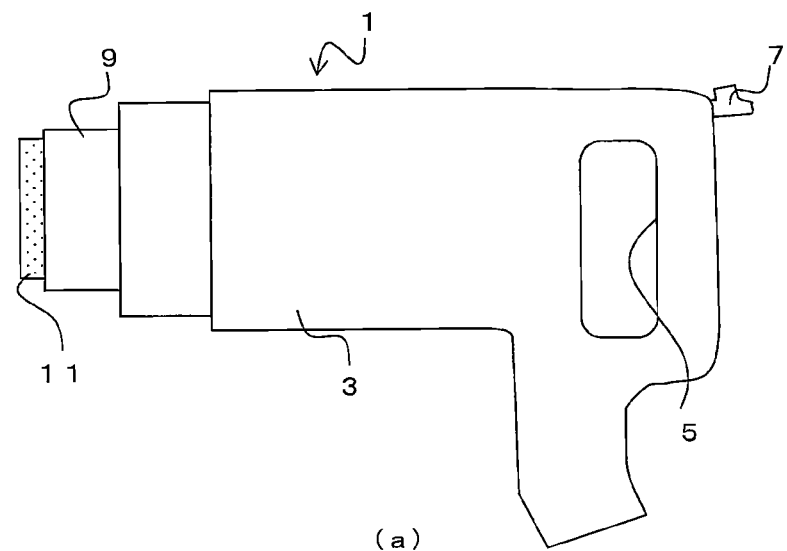
FIG. 3 is a figure that shows the power supply connector 1 at a state of operation, and (a) is a side view, and (b) is a sectional side view.
Figure 3:
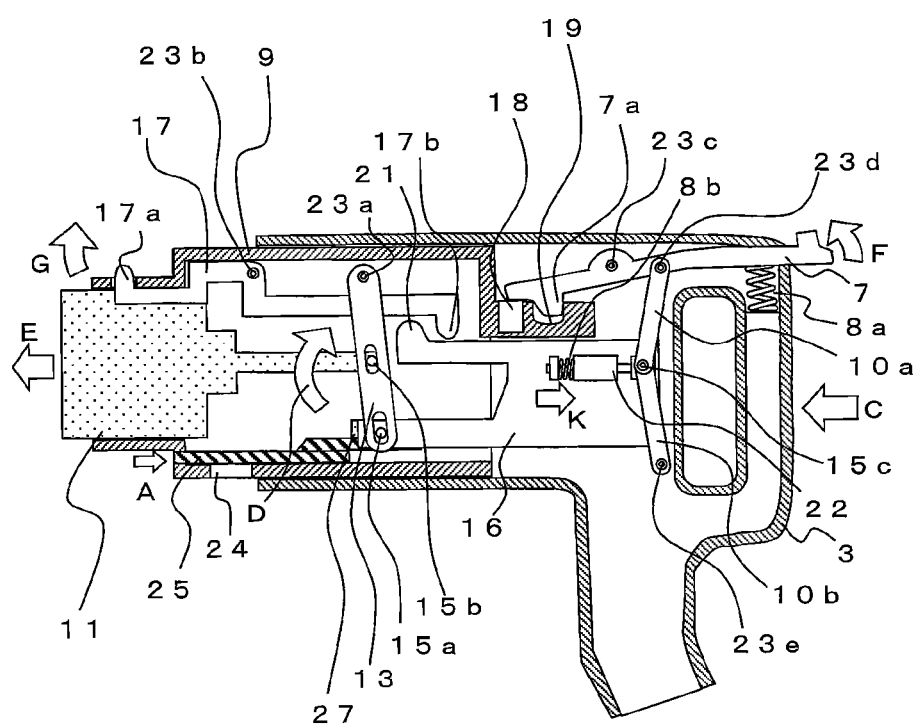

Next, a state in which the power supply connector 1 is operated will be described. FIG. 3 is a figure that shows the power supply connector 1 in a state where the grasping member is moved, and FIG. 3(a) is a side view, and FIG. 3(b) is a sectional side view.

As described previously, in the normal state, the grasping member 3 and the case 9 are locked by the locking member 27. When the slider 25 is pushed in (in the direction of arrow A in the figure) from this state, the locking member 27 is pushed by the slider 25 and the locking member 27 moves. At this moment, the lock between the grasping member 3 and the case 9 is released by the movement of the locking member 27.

When the grasping member 3 is moved forward with respect to the case 9 (in the direction of arrow C in the figure) in a state where the lock between the case 9 and the grasping member 3 is released, the linkage 15a, which is jointed to the grasping member 3 (connection bar 16), is pushed in toward the front. Because the linkage 15a moves forward, the arm 13 rotates (in the direction of arrow D in the figure) with the pin 23a as its axis of rotation. The connector body 11, which is connected to the arm 13 with the linkage 15b, moves toward the same direction as the grasping member 3 (in the direction of arrow E in the figure), due to the rotation of the arm 13.

Note that the distance of movement for the grasping member 3 and the distance of movement for the connector body 11 with respect to the case 9 differ, because the coupling positions to the arm 13 differ for the grasping member 3 and the connector body 11. Specifically, when the ratio of the distance of the linkages 15a and 15b from the pin 23a is 2:1, then if the distance of movement of the grasping member 3 with respect to the case 9 is set as 2, the distance of movement of the connector body 11 becomes 1. That is, the mechanism of the arm 13 etc., functions as a deceleration mechanism. By having a deceleration mechanism, the insertion-extraction process of the connector can be performed with little force.

Further, because the grasping member 3 moves forward with respect to the case 9, joint 17b and joint 21 join together to fit. Thus, the locking member 17 rotates with the pin 23b serving as its axis of rotation. That is, the locking member 17 rotates because the joint 17b side is pushed downward, and the lock pin 17a on the other end is pushed upward. Thus, the lock pin 17a protrudes outward (in the direction of arrow G in the figure) from the case 9 through the opening. Note that the locking member 17 may be formed with a spring etc., so that it constantly tries to return to the state shown in FIG. 3 (a state wherein the joint 17b is pushed down).

Further, because the grasping member 3 moves forward with respect to the case 9, the lock pin 7a of the lock lever 7 moves toward the concaved part 19. At this moment, the vicinity of the rear end of the lock lever 7 is pushed upward by the spring 8a (in the direction of arrow F in the figure). Thus, the lock lever 7 rotates with the pin 23c serving as its axis of rotation. Hence, the lock pin 7a fits into the concaved part 19.

A limit switch 18, which is a detection means, is provided in the vicinity of the concaved part 19 of the case 9. When the lock pin 7a fits into the concaved part 19, the tip of the lock lever 7 comes in contact with the limit switch 18. Thus, the definite fitting of the lock pin 7a to the concaved part 19 can be detected. Note that the detection means may be of other compositions.

Figure 4:
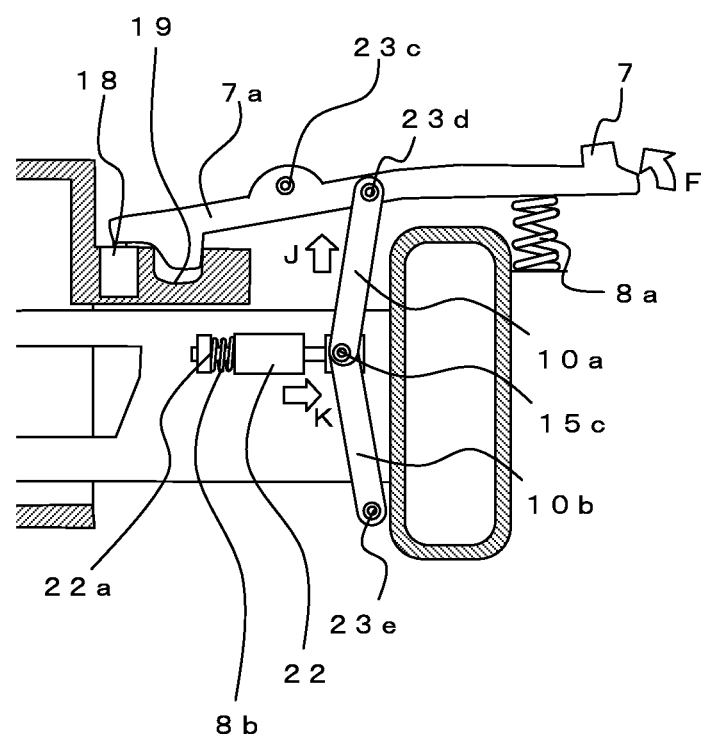
FIG. 4 is an enlarged view of the vicinity of the lock lever 7 of the power supply connector 1 at a state of operation.
Figure 5:
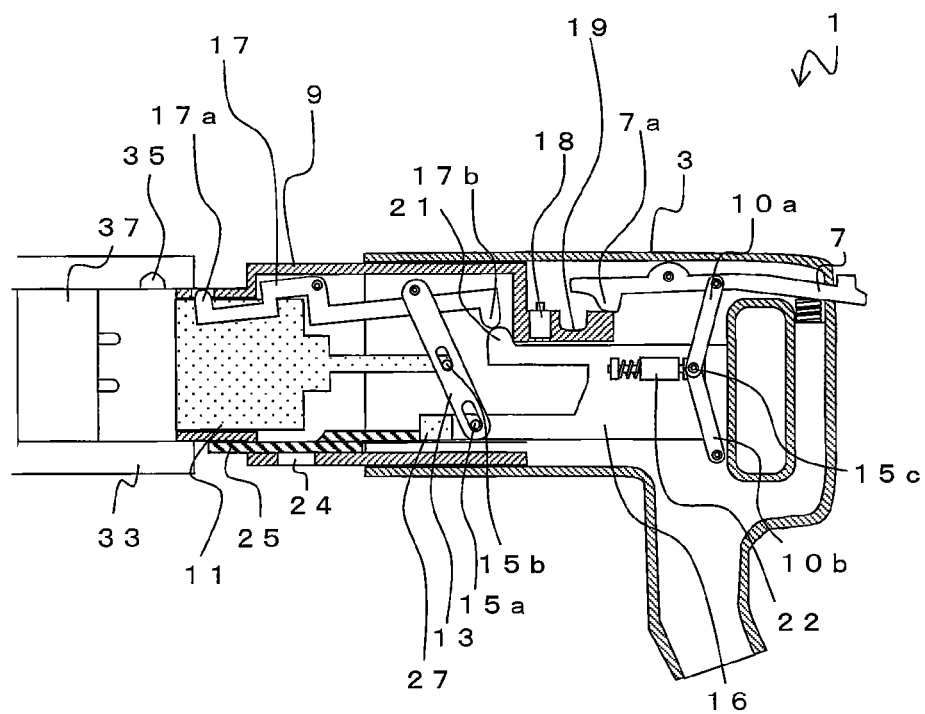
FIG. 5 is a figure that shows a state in which the power supply connector 1 is connected to the power reception connector 33, and (a) is a sectional side view, and (b) is a bottom perspective view showing the movement of the slider 25 etc.
Figure 5:
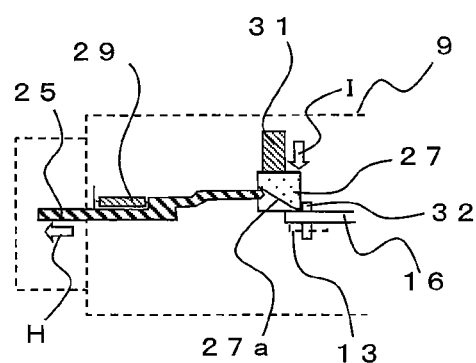

When the lock lever 7 operates, the force is conveyed to the electromagnetic solenoid 22 via link members 10a and 10b. FIG. 4 is an enlarged view of the vicinity of the lock lever 7. As described previously, the link member 10a is connected to the lock lever 7 by a pin 23d. Thus, by the upward movement of the lock lever 7, the link member 10a is pulled upward (in the direction of arrow J in the figure).

At this point, the bottom end of the link member 10b is fixed to the grasping member 3 by the pin 23e. Thus, link members 10a and 10b move in the direction that increases their angle, along with the movement of the lock lever 7. That is, the linkage 15c moves backward.

At this moment, the plunger 22a connected to the linkage 15c moves toward the rear side (in the direction that protrudes from the electromagnetic solenoid 22 body,) (in the direction of arrow K in the figure) in opposition to the restoration force of the spring 8b. Thus, when the plunger 22a is unable to move with respect to the electromagnetic solenoid 22 body due to freezing etc., the linkage 15c cannot move. Hence, in such a case, the lever 7 cannot rotate around the pin 23c, and the state of FIG. 4, wherein the lock pin 7a is fit into the concaved part 19, cannot be obtained. Therefore, the operator can understand whether or not the plunger 22a is in a movable state.

If the plunger 22a is in a movable state, the lock pin 7a fits into the concaved part 19 by the lock lever 7 operating. Thus, the movement of the grasping member 3 with respect to the case 9 is locked. That is, the lock lever 7 functions as a locking means that locks the grasping member 3 (and the connector body 11) from moving with respect to the case 9, and functions as a release mechanism of the same lock by operating the lock lever 7 (pressing down the outside end of the lock lever 7). Thus, the connected state of the connector can be maintained with certainty, while further allowing easy release.

Note that a display part that shows the position of the lock lever 7 may be provided at the top part of the handle 5. For example, in the normal state shown in FIG. 1, the lock lever 7 is in a state in which the lock pin 7a side is pushed up. Thus, the lock lever 7 is in a state of being rotated toward the right side in the figure, with the pin 23c serving as the axis. On the other hand, in a state shown in FIG. 3, the lock lever 7 is in a state in which the lock pin 7a side is pushed down. Thus, the lock lever 7 is in a state of being rotated toward the left side in the figure with the pin 23c serving as the axis.

That is, by providing an opening on part of the grasping member 3 to serve as a display part that enables confirmation of the state of the lock lever 7, whether the power supply connector 1 is in a locked state (the state of FIG. 3) or in a released state (normal state) can easily be observed. Note that the method of observation of the state of the lock lever 7 and the arrangement of the display part can be any method.

Further, a parallel link may be used as the sliding part of the grasping member 3 (or the connector body 11) and the case 9. By using a parallel link, rattling of the grasping member 3 (or the connector body 11) and the case 9 during sliding is less likely to occur, and the moving range can be regulated.

Next, the method of utilizing the power supply connector 1 will be described. FIG. 5 to FIG. 8 are figures that show the process of connecting the power supply connector 1 to the power reception connector 33, and FIG. 5(a) to FIG. 7(a) are sectional side views and FIG. 5(b) to FIG. 7(b) are bottom perspective views that show the movement of the slider 25 etc., and FIG. 8 is a figure that shows the movement of the electromagnetic solenoid 22.

First, as shown in FIG. 5(a), the power supply connector 1 in a normal state is faced toward the power reception connector 33. Specifically, the tip of the case 9 is inserted into the concaved part of the power reception connector. Note that a connector body 37 is accommodated within the power reception connector 33. In this state, the male-female terminals of the connector bodies 11 and 37 are arranged with a slight gap and are not in a connected state.

Thus, as shown in FIG. 5(b), the tip of the slider 25 does not come in contact with the power reception connector 33 and protrudes from the front of the case 9. Note that the slider 25 is constantly biased toward the front (in the direction of arrow H in the figure) by an elastic member 29 provided inside the case 9. That is, the slider 25 always protrudes from the front of the case 9 in the normal state.

A locking member 27 is provided at the rear end of the slider 25 inside the case 9. The locking member 27 is pushed toward the connection bar 16 (that is, perpendicular to the sliding direction of the slider 25) (in the direction of arrow I in the figure) by an elastic member 31. As shown in the figure, the side of the locking member 27 comes in contact with, for example, the pin 32 of the connection bar 16. Thus, the connection bar 16 is prevented from moving any further to the front by the locking member 27. For this reason, the grasping member 3, to which the connection bar 16 is fixed, is regulated from moving with respect to the case 9 and becomes locked.

Thus, the grasping member 3 would not move forward with respect to the case 9, even when, for example, the case 9 is inserted into the power reception connector 33 obliquely, or the case 9 comes in contact with the rim of the power reception connector 33. That is, when the locking member 27, which is a case lock mechanism, is in the locked state, the case 9 is not pushed in towards the interior of the grasping member 3, even when the grasping member 3 is pushed forward.

Note that part of the slider 25 can be observed from the opening 24. Thus, in a state where the slider 25 protrudes forward, by putting a mark or a color on the part that corresponds to the opening 24, the state in which the slider 25 protrudes forward can be confirmed from the opening 24.

Further, in a state in which the case is arranged in the power reception connector 33 side, a concaved part 35 is formed at a position corresponding to the lock pin 17a, within the power reception connector 33 side. To align the position of the lock pin 17a and the concaved part 35, or to align the position of the aforementioned male-female terminals, a guide etc. may be formed on the outer surface of the case 9 for determining the position in relation to the power reception connector.

Figure 6:
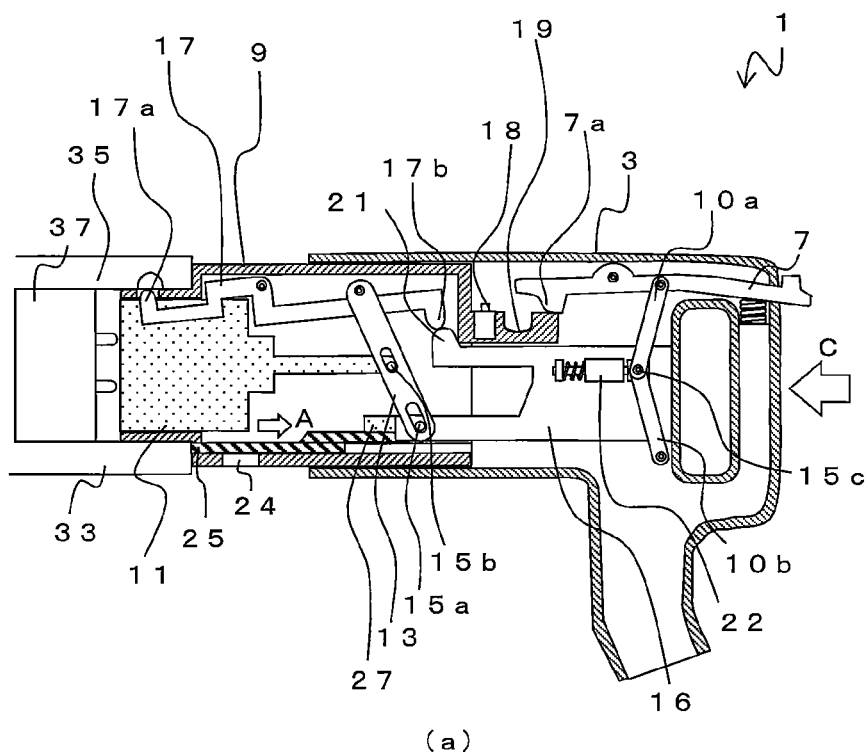
FIG. 6 is a figure that shows a state in which the power supply connector 1 is connected to the power reception connector 33, and (a) is a sectional side view, and (b) is a bottom perspective view showing the movement of the slider 25 etc.
Figure 6:
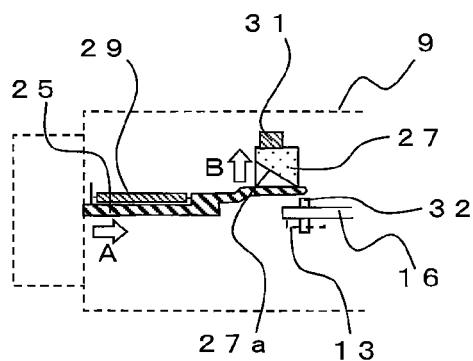

Next, as shown in FIG. 6, the grasping member of the power supply connector 1 is pushed into the power reception connector 33 side (in the direction of arrow C in the figure), which leads the level difference of the case 9 to touch the rim of the power reception connector 33. Since the slider 25 protrudes from the level difference part of the case 9, the slider 25 comes in contact with the rim of the power reception connector 33.

Thus, as shown in FIG. 6(b), the slider 25 is pushed backward (inside the case 9) (in the direction of arrow A in the figure) in opposition to the force of the elastic member 29 that presses forward. The rear end of the slider 25 comes in contact with the locking member 27. A tapered part 27a is formed on the surface of the locking member 27 that comes in contact with the slider 25.

Thus, when the slider 25 moves backward (in the direction of arrow A in the figure), the rear end of the slider 25 and the tapered part 27a slides, and converts the direction of movement of the locking member 27. That is, the locking member 27 moves in the direction perpendicular to the sliding direction of the slider 25 (in the direction of arrow B in the figure), in opposition to the pressing force of the elastic member 31. Thus, the locking member 27 moves in a direction away from the pin 32. This causes the locked state between the locking member 27 and the pin 32 (connection bar 16) to be released.

Note that the detection means for detecting whether or not the case 9 has been inserted into the power reception connector 33 is not limited to a slider 25 as shown in the figure, and may be any method as long as it operates when the case 9 is inserted. Further, the mechanism for releasing the case lock mechanism when detected by the insertion detection means does not necessarily have to be a locking member 27 as shown in the figure, and may be any method depending on the insertion detection means, as long as it is able to release the locked state.

In this manner, when the case 9 is completely inserted into the power reception connector 33, the locked state of the case 9 and the grasping member 3 is released, and both become movable. Note that part of the slider 25 can be observed from the opening 24. Thus, by putting a mark or color at the position corresponding to the opening in a state wherein the slider 25 is pushed backward, the state of the slider 25 being pushed backward can be observed from the opening 24. That is, the secure insertion of the case 9 to the power reception connector 33 can be observed.

Figure 7:
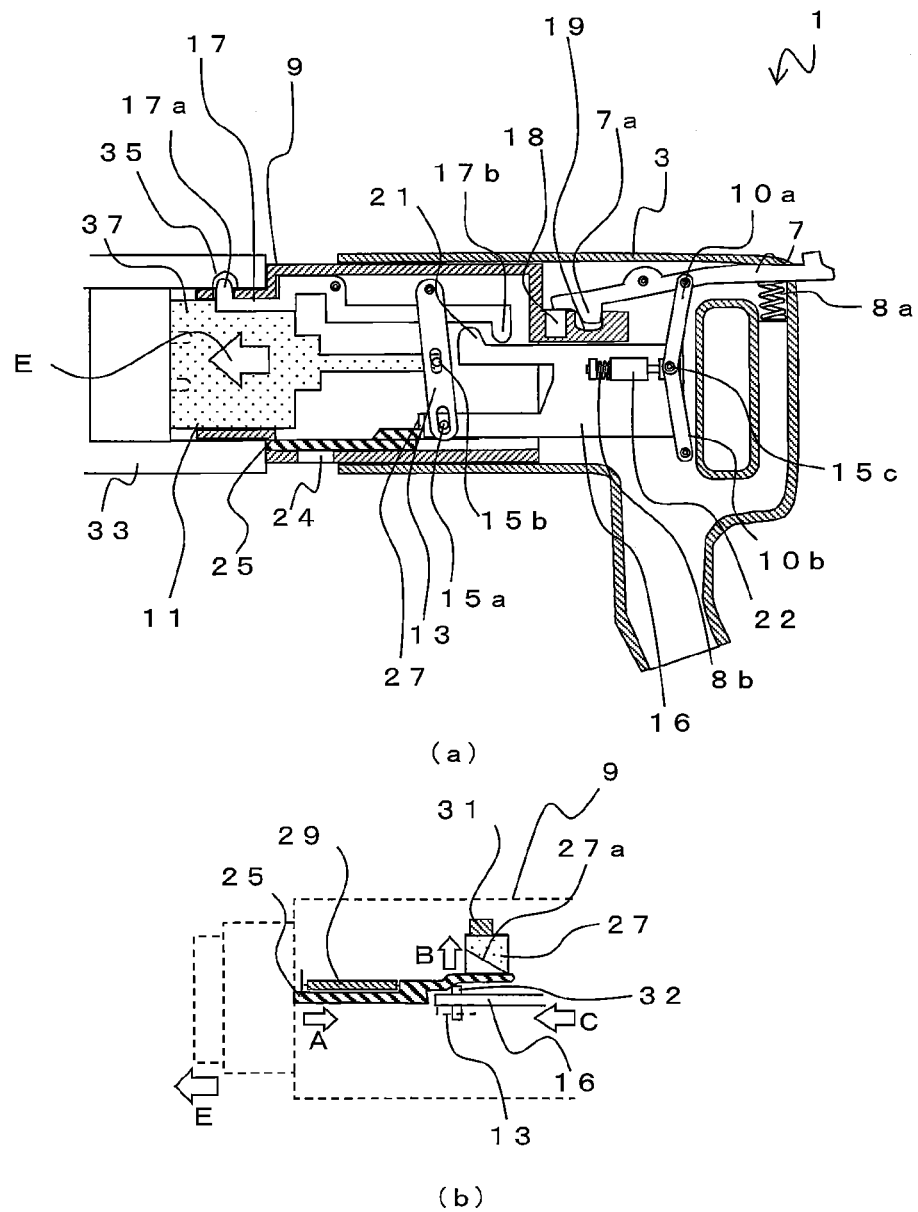
FIG. 7 is a figure that shows a state in which the power supply connector 1 is connected to the power reception connector 33, and (a) is a sectional side view, and (b) is a bottom perspective view showing the movement of the slider 25 etc.
Figure 8:
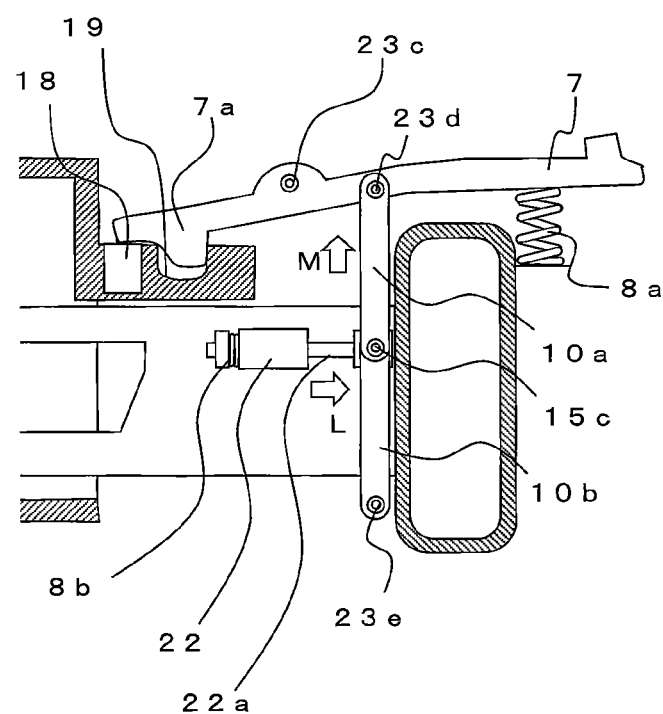
FIG. 8 is an enlarged view of the vicinity of the lock lever 7 at a state in which the electromagnetic solenoid 22 is operated.

Next, as shown in FIG. 7, the grasping part 3 of the power supply connector 1 is pushed into the power reception connector 33 side (in the direction of arrow C in the figure). As previously stated, since the case 9 comes in contact with the power reception connector 33, it cannot be further pushed in. On the other hand, the locked state of the grasping member 3 with respect to the case 9 is released. That is, as shown in FIG. 7(b), the pin 32 does not come in contact with the locking member 27. Thus, the connection bar 16 does not come in contact with the locking member 27 and moves forward (in the direction of arrow C in the figure).

For this reason, the grasping member 3 can be moved forward with respect to the case 9. At this point, the connector body 11 moves forward with respect to the case 9 (in the direction of arrow E in the figure) along with the movement of the grasping member 3. Thus, the connector body 11 protrudes from the front of the case 9 and connects to the connector body 37 of the power reception connector side.

At this moment, when the ratio of the distance of movement of the grasping member 3 and the connector body 11 with respect to the case 9 is 2:1, by pushing the grasping member in a movement distance that is twice the spare length of connection, which connects the connector body 11 and the connector body 37, the connector body 11 can be moved just enough to allow the connectors to connect. That is, the connectors can be connected by pushing in the grasping member 3 with half the force necessary for connecting the two connectors (interconnection resistance). Note that the deceleration ratio of the deceleration mechanism can be set arbitrarily, taking into consideration the interconnection resistance and operability.

Further, in the state shown in FIG. 7(a), as described previously, the lock pin 17a fits into the concaved part 35. For this reason, the power reception connector 33 and the power supply connector 1 are locked in a connected state. Further, the lock pin 7a at the end of the lock lever 7 fits into the concaved part 19. Thus, even when the cable etc., which is abbreviated in the figure, is pulled, the power supply connector 1 is not easily disconnected from the power reception connector 33.

When the lock pin 7a fits into the concaved part 19, the limit switch 18 is turned ON by the tip of the lock lever 7. The connected connectors become electrically conductible by the limit switch 18 being turned ON.

When electric conduction of the connectors begins, as shown in FIG. 8, the electromagnetic solenoid 22 operates. The electromagnetic solenoid 22 constantly pushes the plunger 22a toward the linkage 15c in opposition to the spring 8b (in the direction of arrow L in the figure) during electric conduction. The link members 10a and 10b move apart in an opening direction by the movement of the plunger 22a. Thus, the top part (pin 23d) of the link member 10a is pushed upward (in the direction of arrow M in the figure). Hence, it becomes impossible to release the lock lever 7 during electric conduction. For this reason, the operator cannot release the lock of the lock lever 7 during electric conduction, and the connection of the connector cannot be pulled out.

Note that when disconnecting the power supply connector 1, by stopping electric conduction, the operation of the electromagnetic solenoid 22 stops. When the electromagnetic solenoid stops, the plunger 22a is pulled backwards by the spring 8b. By pressing down the end of the lock lever 7 in this state, the lock pin 7a can be pushed up. By pulling back the grasping member 3 after the lock pin 7a is released from the concaved part 19, joint 17b moves above joint 21, which leads the lock by the lock pin 17a to be released. Thus, the power supply connector 1 can easily be disconnected.

Figure 9:
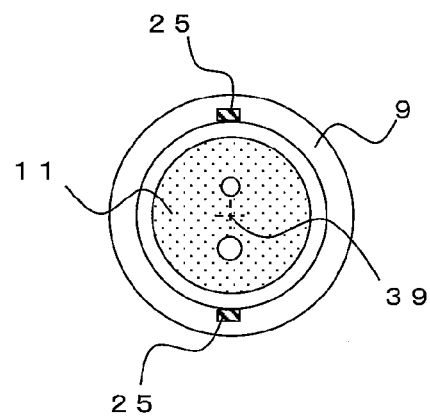
FIG. 9 is a front view of a state in which multiple sliders 25 are provided.

Note that although an example wherein one set of slider 25 and locking member 27 was arranged was shown in the above-described example, the present invention is not limited to such. For example, as shown in FIG. 9, multiple pairs of sliders 25 (and corresponding locking members 27 etc.) may be arranged.

When multiple sliders 25 are used, it is preferable that they are arranged in a point symmetrical position with the connector center 39, which is the center of the connector body 11 (case 9) from the front view of the connector body 11, as its center point. By taking such position, the pushing force of the slider 25 works evenly against the connector center 39 when the case 9 is inserted to the power reception connector 33, and thus, the case 9 can be inserted into the power reception connector 33 more precisely.

As described above, by using the power supply connector 1 of the present embodiment, connection with the power reception connector can be easily performed without the use of large force. In particular, because the pushing movement of the grasping member by the operator matches the direction of connection of the connector body 11 in the power supply connector 1, the operator can easily understand the connection process instinctively.

Further, by gearing the plunger 22a of the electromagnetic solenoid 22 with the movement of the lock lever 7, the plunger 22a can be moved slightly when locking the lock lever 7. Thus, when the plunger 22a is in an inoperable state due to freezing etc., the lock lever 7 loses its function as a locking means. Hence, electric conduction can only be made possible when the electromagnetic solenoid 22 operates.

At this point, because the electromagnetic solenoid 22 is constantly in operation during electric conduction, the lock lever 7 cannot be released during electric conduction. Thus, the operator is unable to release the lock lever 7 to pull out the connector during electric conduction. Hence, the occurrence of arc discharge etc. due to disconnection of the connector during electric conduction can be prevented.

Further, by providing a case lock mechanism that locks the case 9 and the grasping member 3, in a normal state, the grasping member 3 cannot move with respect to the case 9. Thus, the grasping member 3 cannot be moved into the case 9, while the case 9 is not completely inserted into the power reception connector 33.

Although embodiments of the present invention have been described in detail above with reference to the accompanying figures, the present invention is not limited to such embodiments. It should be obvious to those in the field that examples of various changes and modifications are included within the realm of the technical idea of the present invention, and it should be understood that such examples are included in the technical scope of the present invention.

For example, the shape of the grasping member 3, as well as the arrangements and shapes of various compositions within the case 9, are not limited to those exemplified in the figures. Further, the structure of the deceleration mechanism is not limited to those exemplified in the figures.

Figure 10:
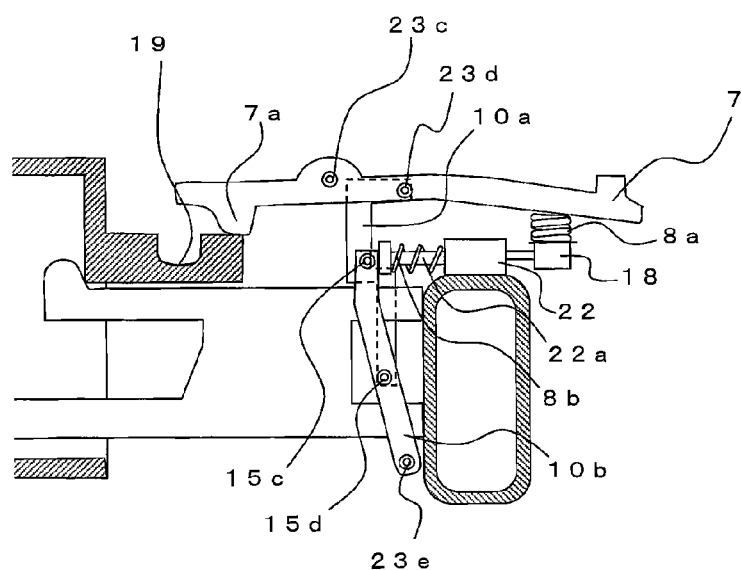
FIG. 10 is an enlarged view of the vicinity of the lock lever 7 of another embodiment.

Furthermore, the structure of the link members 10a and 10b are not limited to those described above. For example, FIG. 10 is an enlarged view of the vicinity of the lock lever 7 in another embodiment. In the example shown in FIG. 10, one end of the link member 10a is rotatably connected to the lock lever by a pin 23d, in a position that is toward the rear side of the pin 23c of the lock lever 7. The link member 10a is a member that is bent in a nearly-hooked shape.

The other end of the link member 10a is rotatably connected to the link member 10b by a linkage 15d. Further, one end of the link member 10b is rotatably connected to the grasping member 3 by a pin 23e.

The other end of the link member 10b is coupled to the end of the plunger 22a of the electromagnetic solenoid 22 at a linkage 15c. Note that in a normal state, the plunger 22a is pushed forward by the spring 8b. Thus, the link member 10b is in a state of being rotated forward (counter-clockwise in the figure) with the pin 23e serving as its fulcrum point.

Figure 11:
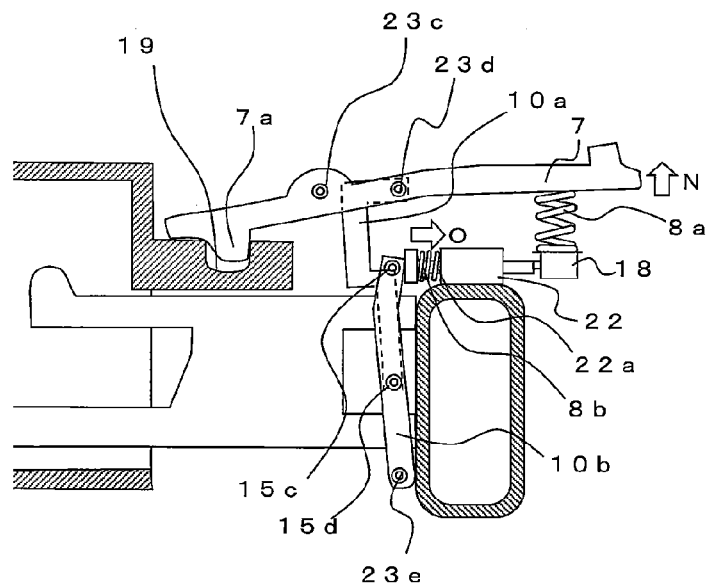
FIG. 11 is an enlarged view of the vicinity of the lock lever 7 at a state in which the power supply connector 1 of another embodiment is operated.

When the power supply connector is operated from this state (the state of FIG. 3), as shown in FIG. 11, the lock pin 7a fits into the concaved part 19. This causes the rear side of the lock lever 7 to rotate upward (in the direction of arrow N in the figure) with the pin 23d serving as its fulcrum point. Thus, the pin 23d also moves upward with the rotation of the lever 7. Hence, the link member 10a is lifted upward.

Since the bottom end of the link member 10a is connected to part of the link member 10b, the linkage 15d of the link members 10a and 10b are lifted upward. Thus, in a normal state, the link member 10b, which was in a slightly slanted state, rotates as if to stand upward (counter-clockwise in the figure) with the pin 23e serving as its fulcrum point. Thus, the linkage 15c moves backward, pushing back the plunger 22a (in the direction of arrow O in the figure). The limit switch 18 is pushed in by the plunger 22a due to the plunger 22a being pushed back. This enables the detection of the lock pin 7a being fit into the concaved part 19 with precision.

As described above, when the plunger 22a cannot move with respect to the electromagnetic solenoid 22 body due to freezing etc., the linkage 15c cannot move. Thus, in such case, the lock lever 7 cannot rotate around the pin 23c, and the lock pin 7a cannot be in a state of fitting into the concaved part 19. For this reason, the operator can determine whether or not the plunger 22a is in an operable state.

Figure 12:
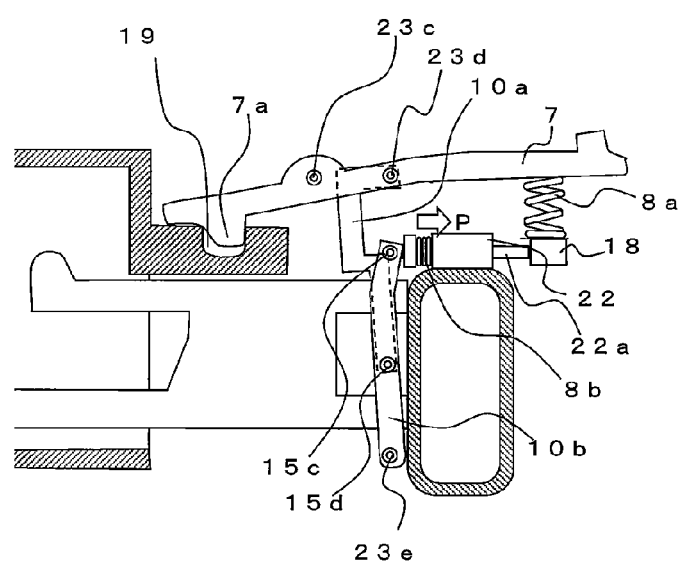
FIG. 12 is an enlarged view of the vicinity of the lock lever 7 at a state in which the electromagnetic solenoid 22 of another embodiment is operated.

When electric conduction through the connector begins, the electromagnetic solenoid 22 operates as shown in FIG. 12. The movement of the plunger 22a pulls the link member 10b toward the back (in the direction of arrow P in the figure). Thus, the top end part of the link member 10a (pin 23d) is pushed upward. Hence, it becomes impossible to perform a release operation of the lock lever 7 during electric conduct. Therefore, the operator cannot release the lock lever 7, and the connector cannot be pulled out during electric conduction.

As described above, even in the compositions shown in FIG. 10 to FIG. 12, the aforementioned effects can be obtained. That is, in the present invention, the shapes etc. of the link members 10a and 10b do not matter. The shapes and arrangements of link members 10a and 10b, and the operation direction of the electromagnetic solenoid 22 etc, may be appropriately set, as long as the plunger 22a of the electromagnetic solenoid 22 can be operated along with the operation of the lock lever 7.

Figure 13:
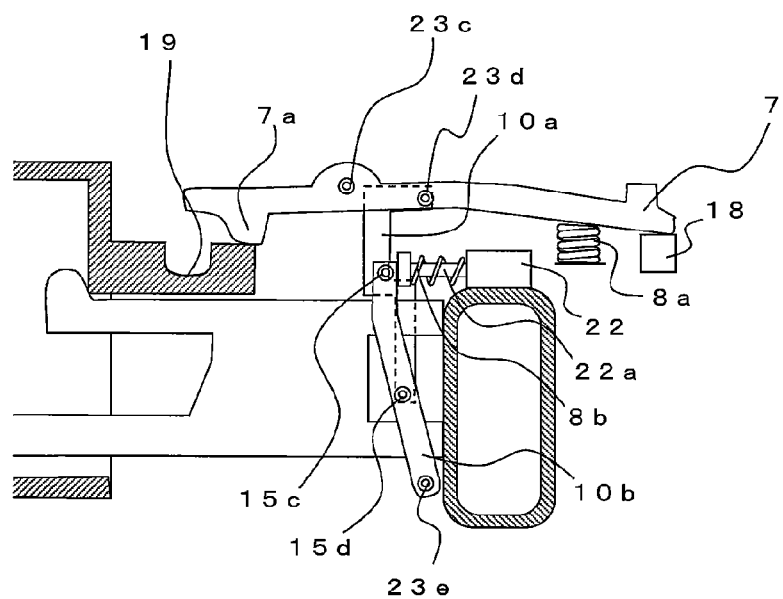
FIG. 13 is an enlarged view of the vicinity of the lock lever 7 of yet another embodiment.
Figure 14:
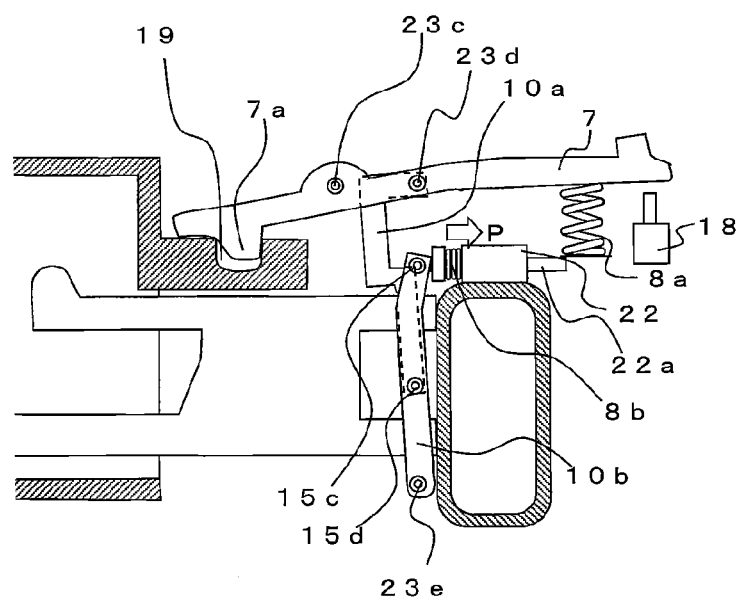
FIG. 14 is an enlarged view of the vicinity of the lock lever 7 at a state in which the electromagnetic solenoid 22 of yet another embodiment is operated.
Figure 15:
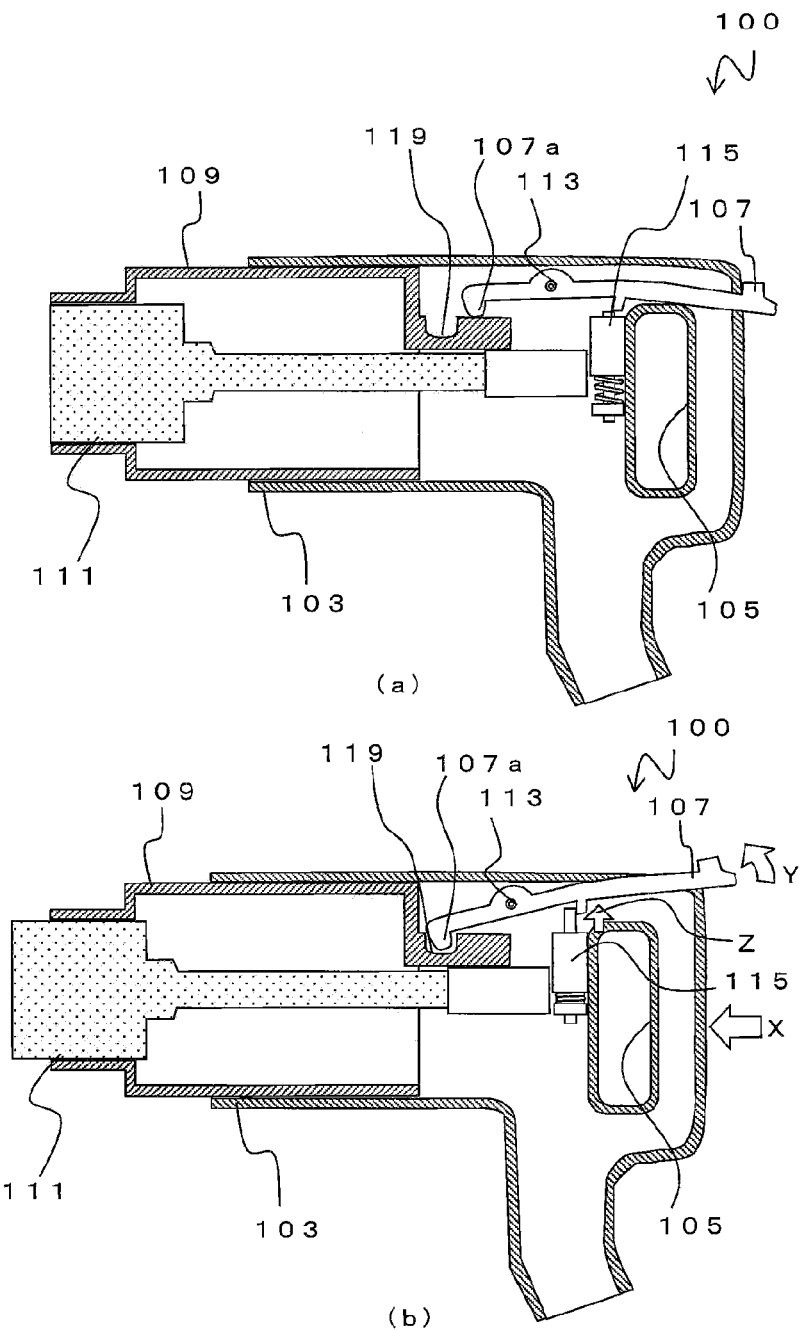
FIG. 15 is a figure showing a conventional power supply connector 100.

Further, the composition shown in FIGS. 13 to 14 may also be taken. The composition of FIG. 13 is similar to that of FIG. 10, but the limit switch 18 comes in contact with the lock lever 7. That is, the limit switch is pushed in at a state in which the lock lever 7 is released.

In contrast, as shown in FIG. 14, when the lock pin 7a fits into the concaved part 19, the lock lever 7 rotates, and detaches from the limit switch 18. The state of the lock lever 7 can also be detected by the limit switch 18 in this manner.

The detection mechanism of the limit switch 18, which is a detection means for detecting the locked state of the lock lever 7, is not limited to that exemplified, as long as it can detect the locked state. For example, it may be operated by other parts such as the link member 10b etc.

DESCRIPTION OF NOTATIONS 1 power supply connector
3 grasping member
5 handle
7 lock lever
7a lock pin
8a, 8b spring
9 case
10a, 10b link member
11 connector body
13 arm
15a, 15b, 15c, 15d linkage
16 connection bar
17 locking member
17a lock pin
17b joint
18 limit switch
19 concaved part
21 joint
22 electromagnetic solenoid
22a plunger
23a, 23b, 23c, 23d, 23e pin
24 opening
25 slider
27 locking member
27a tapered part
29 elastic member
31 elastic member
32 pin
33 power reception connector
35 concaved part
37 connector body
39 connector center
100 power supply connector
103 grasping member
105 handle
107 lock lever
107a lock pin
109 case
111 connector body
113 pin
115 electromagnetic solenoid
119 concaved part

The invention claimed is:

1. A power supply connector for automobiles, which comprises:
   a connector body;
   a case for accommodating the connector body;
   a grasping member that is attached to the case;
   a lock lever that limits the movement of the case with respect to the grasping member;
   a link member that is connected to the lock lever and the grasping member; and
   an electromagnetic solenoid that is fixed to the grasping member; wherein
   a plunger of the electromagnetic solenoid is connected to the link member,
   the connector body and the grasping member are slidable in a direction of nearly the same axis line with respect to the case, when the lock lever is in a released state, and
   by sliding the grasping member with respect to the case and locking the lock lever to the case, the link member operates along with the operation of the lock lever, while the position of the plunger connected to the link member changes, and further,
   by operating the electromagnetic solenoid, a locked state, in which the lock lever is locked to the case by the link member, is maintained.

2. The power supply connector according to claim 1, wherein the case comprises a detection means that is capable of detecting the locked state of the lock lever.

3. The power supply connector according to claim 2, wherein a state of electric conductibility with respect to the connector body is obtained, by detecting the locked state of the lock lever with the detection means, and
   electricity is conducted to the connector body, whereby the electromagnetic solenoid operates.

4. The power supply connector according to claim 3, which further comprises:
   a first spring that presses the lock lever towards a direction of obtaining a locked state for the lock lever; and
   a second spring that retracts the plunger to the direction of the electromagnetic solenoid; wherein
   the sum of the force of pressing the plunger against the link member with the electromagnetic solenoid and the force of pulling out the plunger by moving the link member through the operation of the lock lever with the first spring, is larger than the retracting force of the plunger by the second spring.

* * * * *